R. STONE.
LAWN MOWER SHARPENER.
APPLICATION FILED OCT. 19, 1920.
1,391,702.
Patented Sept. 27, 1921.
2 SHEETS—SHEET 1.
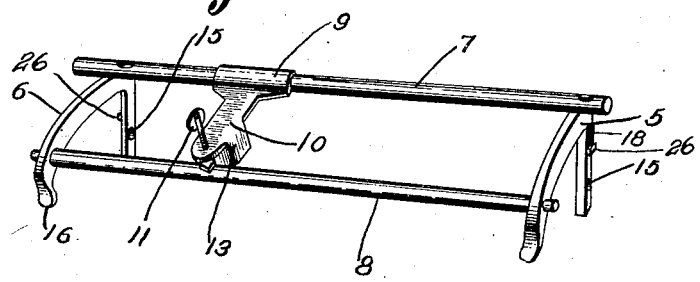
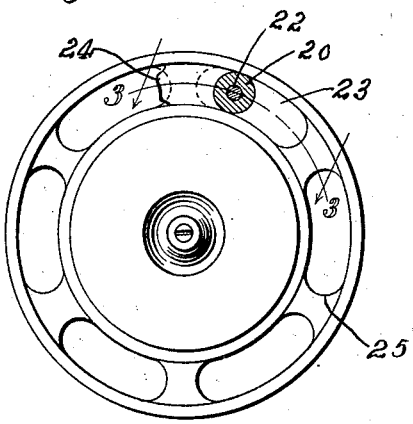
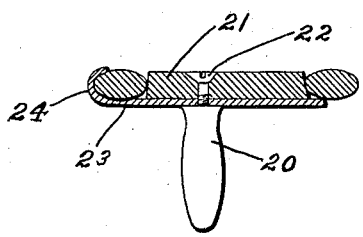
R. Stone.
Inventor
By C.A. Snow & Co.
Attorneys

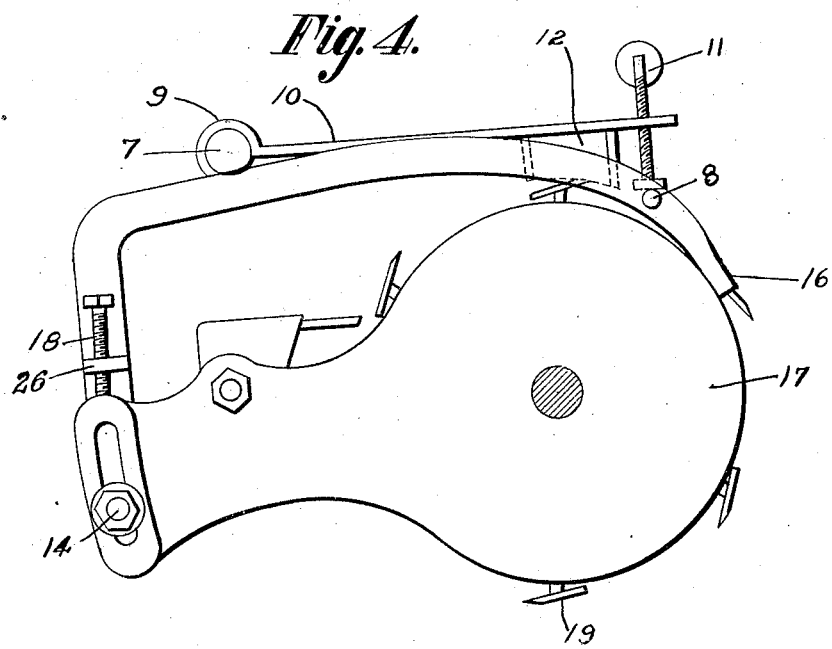
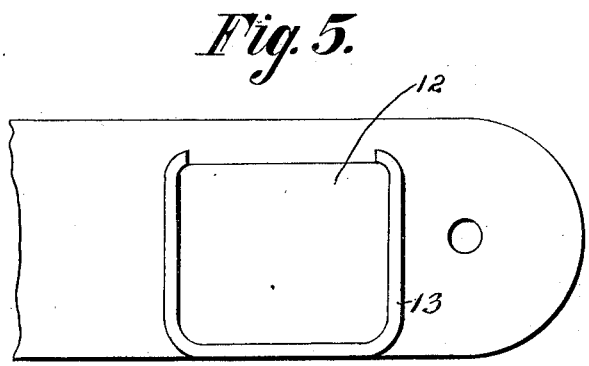

UNITED STATES PATENT OFFICE.

REUBEN STONE, OF OGEMA, WISCONSIN, ASSIGNOR OF ONE-HALF TO OSCAR V. SODER-STROM, OF OGEMA, WISCONSIN.

LAWN-MOWER SHARPENER.

1,391,702. Specification of Letters Patent. Patented Sept. 27, 1921.

Application filed October 19, 1920. Serial No. 418,104.

*To all whom it may concern:*

Be it known that I, REUBEN STONE, a citizen of the United States, residing at Ogema, in the county of Price and State of Wisconsin, have invented a new and useful Lawn-Mower Sharpener, of which the following is a specification.

This invention relates to sharpening devices especially designed for use for sharpening and jointing lawn mower knives or the like, it being an object of the invention to provide means to be attached to a mower so that upon rotation of the blades thereof, the blades will be sharpened.

A further object of the invention is to provide a device of this character which is applied to the usual lawn mower now in use, and one which can be adjusted with respect to the blades under operation, thereby adapting the device for use with lawn mowers of various sizes.

A still further object of the invention is to provide a sharpening device which may be moved transversely of the machine, to cause the same to contact with various portions of the blades being sharpened.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a perspective view of the frame of the sharpening device.

Fig. 2 illustrates a side elevational view of a wheel, showing the operating handle as applied thereto.

Fig. 3 illustrates a sectional view taken on line 3—3 of Fig. 2.

Fig. 4 illustrates an end elevational view of a lawn mower showing the sharpening device as applied.

Fig. 5 illustrates a bottom plan view of the sharpening element and its support.

Referring to the drawings in detail, the frame which supports the sharpening stone includes end members 5 and 6 which are connected by the rods 7 and 8 and which support the end members 5 and 6 in suitable spaced relation with each other, the rod 7 however being preferably circular in cross section to accommodate the curved end 9 of the sharpening stone support 10, so that the sharpening stone support 10 may be moved longitudinally of the rods 7 and 8 to change the location of the sharpening stone with relation to the blades under operation.

This sharpening stone support 10 is of a length so that one end thereof overlies the rod 8, the stone support 10 being provided with a suitable set screw 11 which engages the rod 8 for adjusting the stone support 10 with relation to the frame.

The sharpening stone 12 which comprises any suitable abrasive material is supported by the stone support 10, there being provided a depending flange 13 adapted to embrace the sharpening stone, to securely clamp the same to the support 10.

In the operation of the device, the end members may be secured to the end sections of the lawn mower frame, by passing suitable securing means indicated at 14 through the opening 15 of the end members 5 and 6, the portion 16 of the end member resting on the end sections 17 of the lawn mower frame. In order that the rear of the sharpening frame may be adjusted with respect to the mower frame, an apertured ear 26 extends laterally from each side of the frame, which ears accommodate the adjusting screws 18 that engage the mower frame.

From the foregoing it is obvious that when the attachment is in a position as described, the blades 19 of the mower will contact with the sharpening stone 12 upon rotation thereof, and to accomplish such rotation, a handle 20 is provided, which handle is secured to the base 21, as by means of the screw 22, which screw also clamps the handle to the plate 23, which has a hooked end 24 adapted to embrace a portion of one of the spokes of the wheel 25.

It might be further stated that while the blades are being rotated to contact with the sharpening stone, the sharpening stone may be moved longitudinally of the rods 7 and 8 to change its location with respect to the blades to insure a true sharpening of the blades.

Having thus described the invention, what is claimed as new is:—

In a device of the character described, a frame, a pair of spaced rods, end members having connection with the rod, means for securing the frame to a lawn mower, a support having a curved extremity embracing one of the rods, a sharpening element carried by the support, said support having a threaded opening overlying one of the rods, a screw passing through the opening and having an enlargement contacting with the opposite rod of the frame for adjusting the support with respect to the frame, and flanges on the support for carrying the sharpening element.

In testimony that I claim the foregoing as my own, I have hereto affixed my signature in the presence of two witnesses.

REUBEN STONE.

Witnesses:
  E. A. HEDEN,
  CARL H. HEDEN.